(12) United States Patent
Suh

(10) Patent No.: US 12,391,133 B2
(45) Date of Patent: Aug. 19, 2025

(54) FUEL CELL VEHICLE

(71) Applicants: Hyundai Motor Company, Seoul (KR); Kia Corporation, Seoul (KR)

(72) Inventor: Jung Do Suh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 466 days.

(21) Appl. No.: 17/986,285

(22) Filed: Nov. 14, 2022

(65) Prior Publication Data
US 2023/0226931 A1 Jul. 20, 2023

(30) Foreign Application Priority Data

Jan. 19, 2022 (KR) .................. 10-2022-0007994

(51) Int. Cl.
*B60L 50/71* (2019.01)

(52) U.S. Cl.
CPC .................. *B60L 50/71* (2019.02)

(58) Field of Classification Search
CPC ........ B60L 50/71; B60L 3/0007; B60L 50/72; B60L 50/70; H01M 2250/20; H01M 8/2475; H01M 8/247; Y02T 90/40; B60K 1/04; B60K 2001/0405; B62D 25/2036; B62D 29/008; Y02E 60/50
See application file for complete search history.

(56) References Cited

U.S. PATENT DOCUMENTS

| | | | | |
|---|---|---|---|---|
| 9,711,819 B2 * | 7/2017 | Ishikawa | ............. | B60L 50/71 |
| 9,941,495 B2 * | 4/2018 | Naito | ............. | B60L 50/71 |
| 10,033,062 B2 * | 7/2018 | Naito | ............. | B60K 1/04 |
| 10,923,755 B2 * | 2/2021 | Naito | ............. | B60L 58/33 |
| 2010/0147608 A1 * | 6/2010 | Okabe | ............. | H01M 8/248 29/428 |
| 2016/0344058 A1 * | 11/2016 | Naito | ............. | H01M 8/2485 |
| 2017/0117570 A1 * | 4/2017 | Ishikawa | ............. | H01M 8/2475 |
| 2017/0256762 A1 * | 9/2017 | Naito | ............. | B60K 1/00 |
| 2018/0178844 A1 | 6/2018 | Takahashi | | |

(Continued)

FOREIGN PATENT DOCUMENTS

| | | | | |
|---|---|---|---|---|
| CN | 104124465 A | * | 10/2014 | ......... H01M 8/2475 |
| CN | 105291800 A | | 2/2016 | |

(Continued)

OTHER PUBLICATIONS

Mechanical Engineering Design 6th ed., Joseph E. Shigley et. al., McGrawHill, 2001.

(Continued)

*Primary Examiner* — James A Shriver, II
*Assistant Examiner* — Ian Bryce Shelton
(74) *Attorney, Agent, or Firm* — Fox Rothschild LLP

(57) ABSTRACT

A fuel cell vehicle of the disclosure includes a fuel cell, a system frame including a center member supporting at least a portion of the fuel cell and a peripheral member disposed on at least one of the two side end portions of the center member, which are opposite each other in a vehicle width direction, a vehicle body connection part coupling the peripheral member to a vehicle body, and a plurality of frame connection parts, which couple the peripheral member to the center member, are spaced apart from each other in a first direction parallel to a travel direction, and receive different respective loads.

20 Claims, 11 Drawing Sheets

(56) References Cited

U.S. PATENT DOCUMENTS

| | | | |
|---|---|---|---|
| 2018/0301733 A1* | 10/2018 | Naito | H01M 8/2485 |
| 2020/0369165 A1* | 11/2020 | Yeon | H01M 8/0488 |
| 2022/0181670 A1* | 6/2022 | Kim | H01M 8/04007 |
| 2022/0289013 A1* | 9/2022 | Naito | B60K 1/04 |
| 2023/0395838 A1* | 12/2023 | Isoda | H01M 8/2404 |

FOREIGN PATENT DOCUMENTS

| | | | | |
|---|---|---|---|---|
| CN | 110696640 A | * | 1/2020 | B21D 53/88 |
| CN | 111710891 A | * | 9/2020 | B60L 3/0007 |
| CN | 111959298 A | * | 11/2020 | B60L 3/0007 |
| JP | H08192639 A | | 7/1996 | |
| JP | 2004-161056 A | | 6/2004 | |
| JP | 2011-121387 A | | 6/2011 | |
| JP | 2018099918 A | * | 6/2018 | B60L 11/1896 |
| JP | 2020104549 A | * | 7/2020 | |
| JP | 6740889 B2 | * | 8/2020 | |
| KR | 20140075035 A | * | 6/2014 | |
| KR | 101776759 B1 | * | 9/2017 | |
| KR | 2021-0091245 A | | 7/2021 | |

OTHER PUBLICATIONS

Design for Manufacturability 2nd ed., James G. Bralla, McGrawHill, 1999.

* cited by examiner

FIG. 6
FIG. 6A
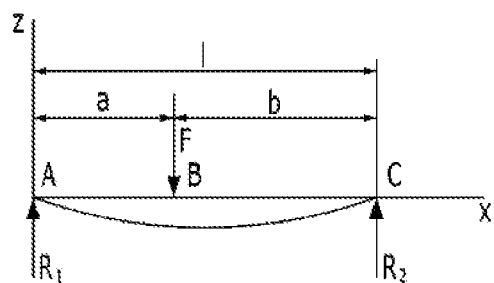
FIG. 6B
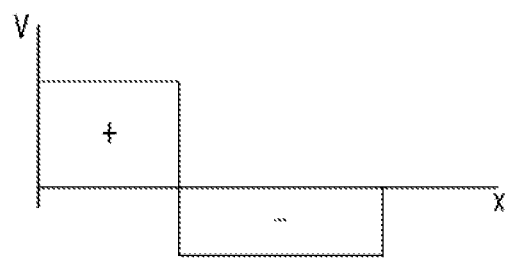
FIG. 6C
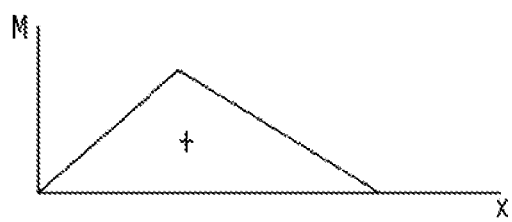

FUEL CELL VEHICLE

CROSS-REFERENCE TO RELATED APPLICATION

This application is based on and claims under 35 U.S.C. § 119 (a) the benefit of Korean Patent Application No. 10-2022-0007994, filed on Jan. 19, 2022, which is hereby incorporated by reference as if fully set forth herein.

TECHNICAL FIELD

Embodiments of the present disclosure relate to a fuel cell vehicle.

BACKGROUND

In general, a vehicle including a fuel cell (hereinafter referred to as a "fuel cell vehicle") does not satisfy vehicle collision safety regulations because a system frame fractured by an external impact is separated from a side member, which is a vehicle body of the fuel cell vehicle. Therefore, research with the goal of solving this problem is underway.

SUMMARY

Accordingly, embodiments of the present disclosure are directed to a fuel cell vehicle that substantially obviates one or more problems due to limitations and disadvantages of the related art.

Embodiments of the present disclosure provide a fuel cell vehicle capable of satisfying collision safety regulations.

However, the objects to be accomplished by the embodiments of the present disclosure are not limited to the above-mentioned objects, and other objects not mentioned herein will be clearly understood by those skilled in the art from the following description.

A fuel cell vehicle according to an embodiment may include a fuel cell, a system frame including a center member supporting at least a portion of the fuel cell and a peripheral member disposed on at least one of the two side end portions of the center member, which are opposite each other in a vehicle width direction, a vehicle body connection part coupling the peripheral member to a vehicle body, and a plurality of frame connection parts, which couple the peripheral member to the center member, are spaced apart from each other in a first direction parallel to a travel direction, and receive different respective loads.

For example, the peripheral member may include a first peripheral member, disposed on one of the two side end portions, and a second peripheral member, disposed on the remaining one of the two side end portions.

For example, the vehicle body may include first and second side members disposed opposite each other in the vehicle width direction and extending parallel to each other in the first direction. The vehicle body connection part may include a first vehicle body connection part, configured to couple the first peripheral member to the first side member, and a second vehicle body connection part, configured to couple the second peripheral member to the second side member.

For example, the plurality of frame connection parts may include first and second frame connection parts, configured to couple the first peripheral member to one of the two side end portions of the center member and spaced apart from each other in the first direction, and third and fourth frame connection parts, configured to couple the second peripheral member to the remaining one of the two side end portions of the center member and spaced apart from each other in the first direction.

For example, the first peripheral member may include a first portion, coupled to the center member via the first frame connection part, and a second portion, coupled to the center member via the second frame connection part. The first portion may be spaced a first spacing distance apart from the first vehicle body connection part in the first direction, and the second portion may be spaced a second spacing distance apart from the first vehicle body connection part in the first direction. The first spacing distance and the second spacing distance may be different from each other.

For example, the first spacing distance may correspond to a distance by which a first point of action in the first portion is spaced apart from a second point of action in the first vehicle body connection part in the first direction, and the second spacing distance may correspond to a distance by which a third point of action in the second portion is spaced apart from the second point of action in the first direction.

For example, the first spacing distance may be shorter than the second spacing distance. A stress applied to a section corresponding to the first spacing distance may be greater than a stress applied to a section corresponding to the second spacing distance.

For example, one of the first portion and the second portion may be coupled to the center member in a fitting manner.

For example, the first portion may be coupled to the center member via the first frame connection part, and the second portion may be coupled to the center member not only via the second frame connection part but also in the fitting manner.

For example, the second peripheral member may include a third portion, coupled to the center member via the third frame connection part, and a fourth portion, coupled to the center member via the fourth frame connection part. The third portion may be spaced a third spacing distance apart from the second vehicle body connection part in the first direction, and the fourth portion may be spaced a fourth spacing distance apart from the second vehicle body connection part in the first direction. The third spacing distance and the fourth spacing distance may be different from each other.

For example, the third spacing distance may correspond to a distance by which a fourth point of action in the third portion is spaced apart from a fifth point of action in the second vehicle body connection part in the first direction, and the fourth spacing distance may correspond to a distance by which a sixth point of action in the fourth portion is spaced apart from the fifth point of action in the first direction.

For example, the third spacing distance may be shorter than the fourth spacing distance. A stress applied to a section corresponding to the third spacing distance may be greater than a stress applied to a section corresponding to the fourth spacing distance.

For example, one of the third portion and the fourth portion may be coupled to the center member in a fitting manner.

For example, the third portion may be coupled to the center member via the third frame connection part, and the fourth portion may be coupled to the center member not only via the fourth frame connection part but also in the fitting manner.

For example, the vehicle body connection part may include a support bracket, having one side coupled to the peripheral member, and an insulator, disposed between the opposite side of the support bracket and the first side member.

For example, the insulator is directly mounted to the second side member.

For example, the support bracket and the insulator have the same form as the second vehicle body connection part.

For example, the first vehicle body connection part and the second vehicle body connection part may have planar shapes formed to be asymmetrical to each other in the vehicle width direction with respect to the center of the center member.

For example, the second vehicle body connection part may be disposed closer to the front side of the fuel cell vehicle than the first vehicle body connection part.

For example, the peripheral member may include aluminum.

As discussed, the system suitably includes use of a controller or processor.

In another embodiment, vehicles are provided that comprise a fuel cell as disclosed herein.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 6A to 6C are diagrams for explaining general equilibrium of forces and moments;

DETAILED DESCRIPTION

Figure 1:
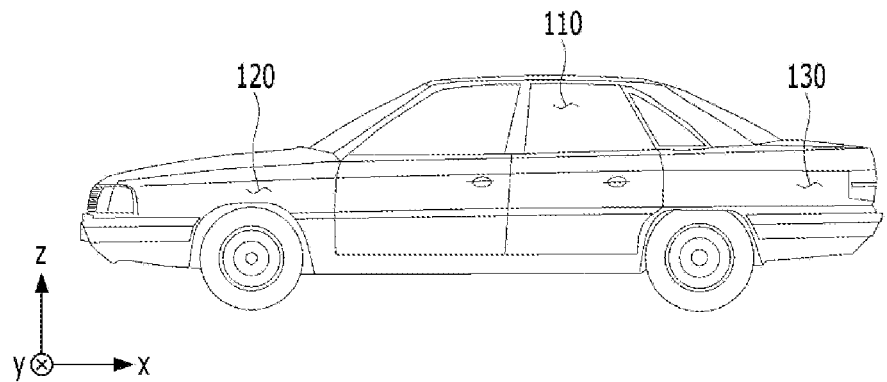
FIG. 1 is a view showing the external appearance of a general fuel cell vehicle.

The present disclosure will now be described more fully hereinafter with reference to the accompanying drawings, in which various embodiments of the present disclosure are shown. The examples, however, may be embodied in many different forms, and should not be construed as being limited to the embodiments of the present disclosure set forth herein. Rather, these embodiments of the present disclosure are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above", and "under/lower part/below", are used only to distinguish between one subject or element and another subject or element, without necessarily requiring or involving any physical or logical relationship or sequence between the subjects or elements.

Hereinafter, a fuel cell vehicle according to embodiments of the present disclosure will be described with reference to the accompanying drawings. The fuel cell vehicle will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely. Hereinafter, for convenience of description, the x-axis direction will be referred to as a "first direction", the y-axis direction will be referred to as a "second direction" or a "vehicle width direction", and the z-axis direction will be referred to as a "third direction". In addition, the first direction corresponds to a direction parallel to the heading direction (or travel direction) of the fuel cell vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMS, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

FIG. 1 is a view showing the external appearance of a general fuel cell vehicle.

Referring to FIG. 1, a fuel cell vehicle may include a passenger compartment 110 in which occupants are seated, a first space 120 located in front of the passenger compartment 110, and a second space 130 located behind the passenger compartment 110. For example, when the fuel cell vehicle travels in the −x-axis direction, the first space 120 may correspond to an engine compartment in which an engine of the fuel cell vehicle is accommodated, and the second space 130 may correspond to a trunk.

The fuel cell vehicle according to the embodiment may correspond to a passenger car, as shown in FIG. 1, or may correspond to a commercial vehicle, unlike what is shown in FIG. 1. The embodiments are not limited to any specific type of vehicle.

Figure 2A:
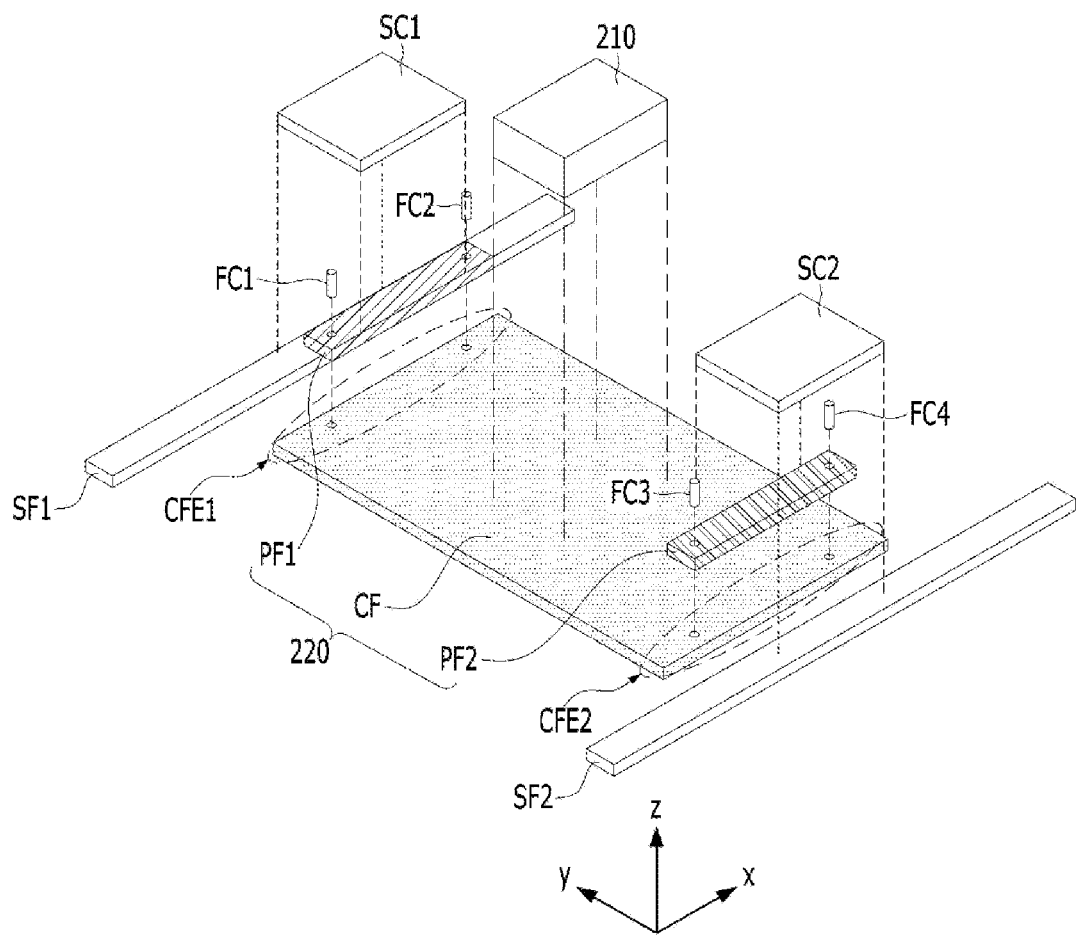
FIG. 2A is an exploded perspective view of a fuel cell vehicle according to an embodiment.
Figure 2B:
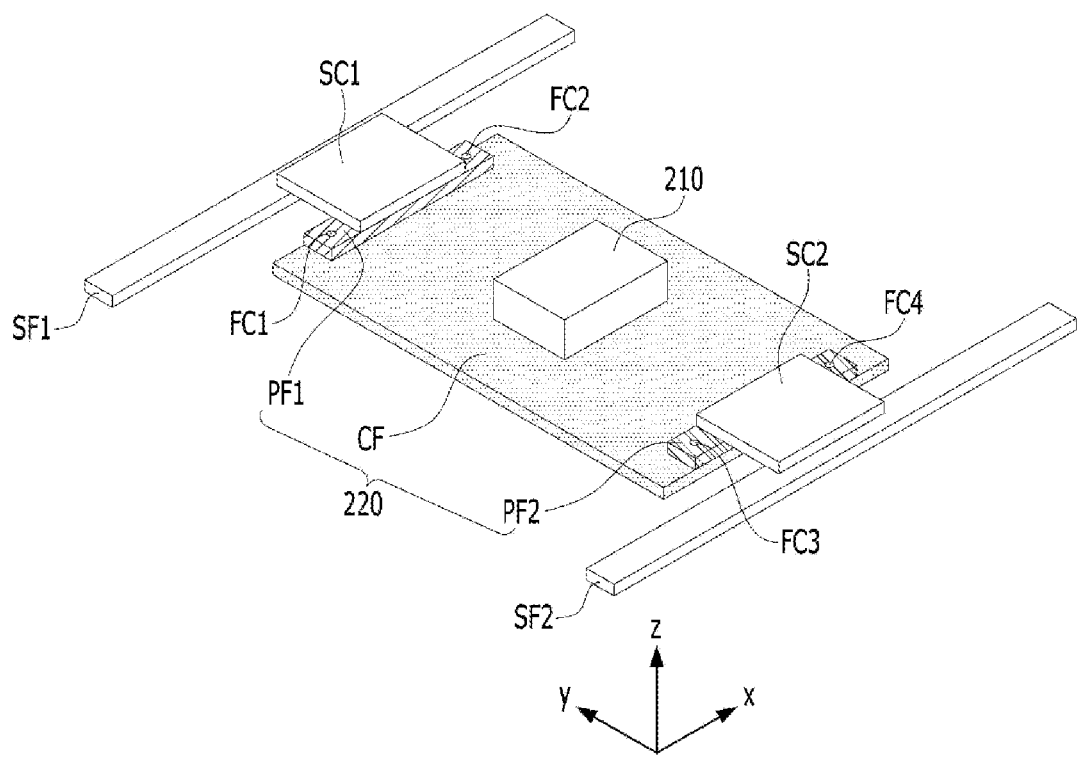
FIG. 2B is a coupled perspective view of an embodiment of the fuel cell vehicle shown in FIG. 2A.
Figure 3:
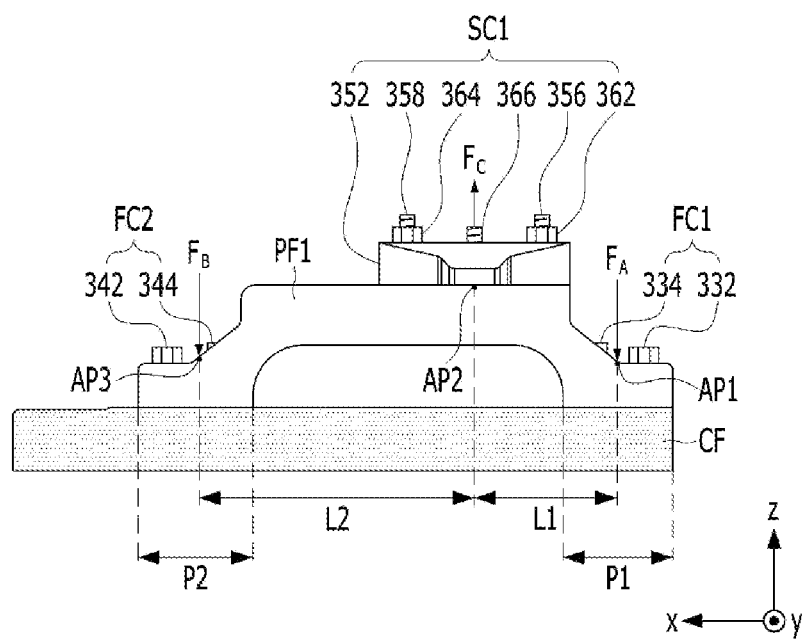
FIG. 3 is a right side view of an embodiment of the fuel cell vehicle shown in FIG. 2B.
Figure 4:
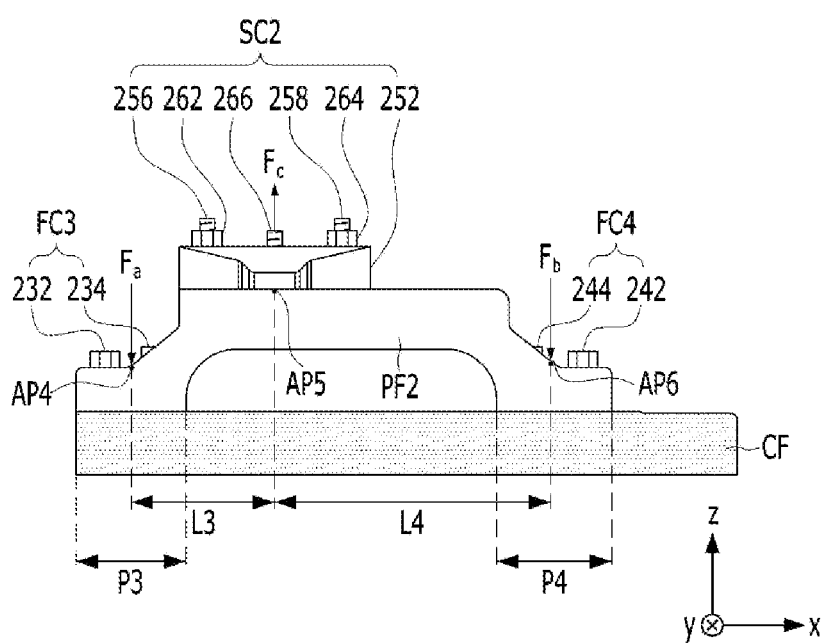
FIG. 4 is a left side view of the embodiment of the fuel cell vehicle shown in FIG. 2B.
Figure 5A:
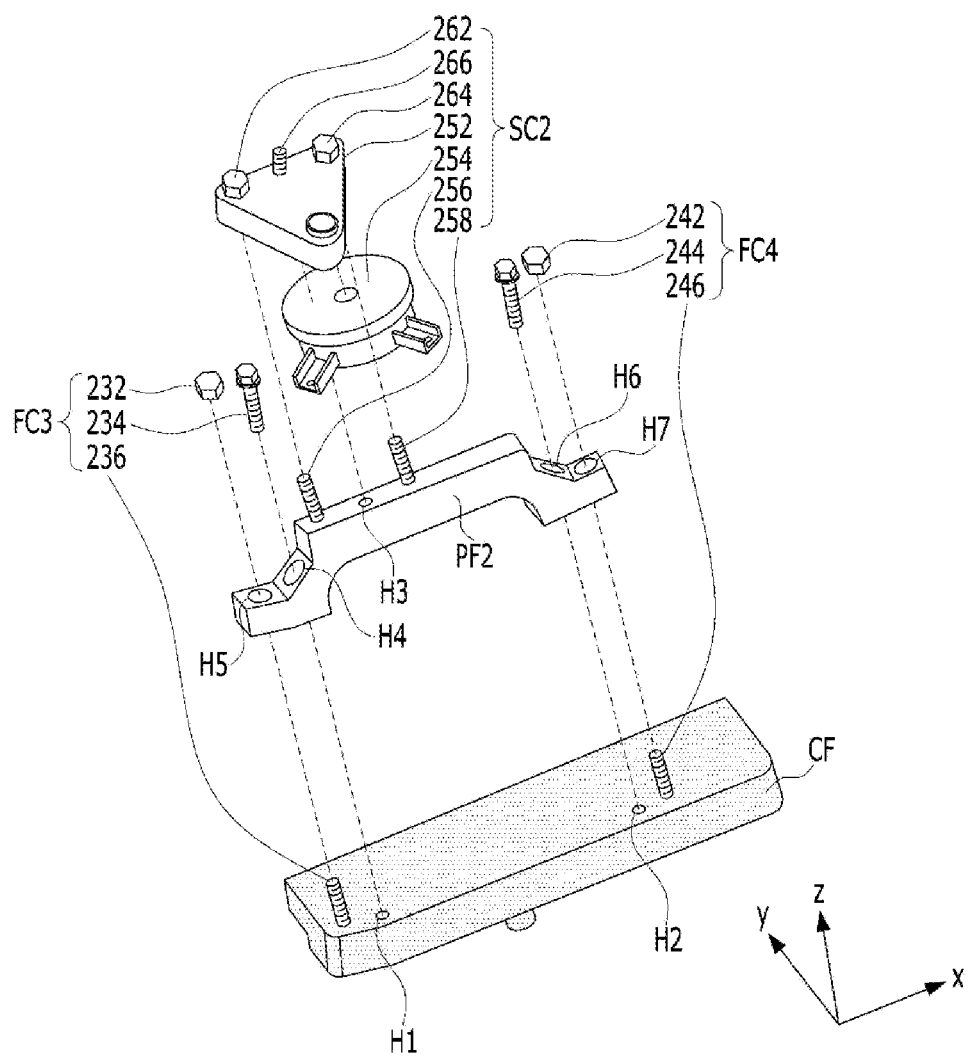
FIG. 5A is an exploded perspective view of an embodiment of the fuel cell vehicle shown in FIG. 4.
Figure 5B:
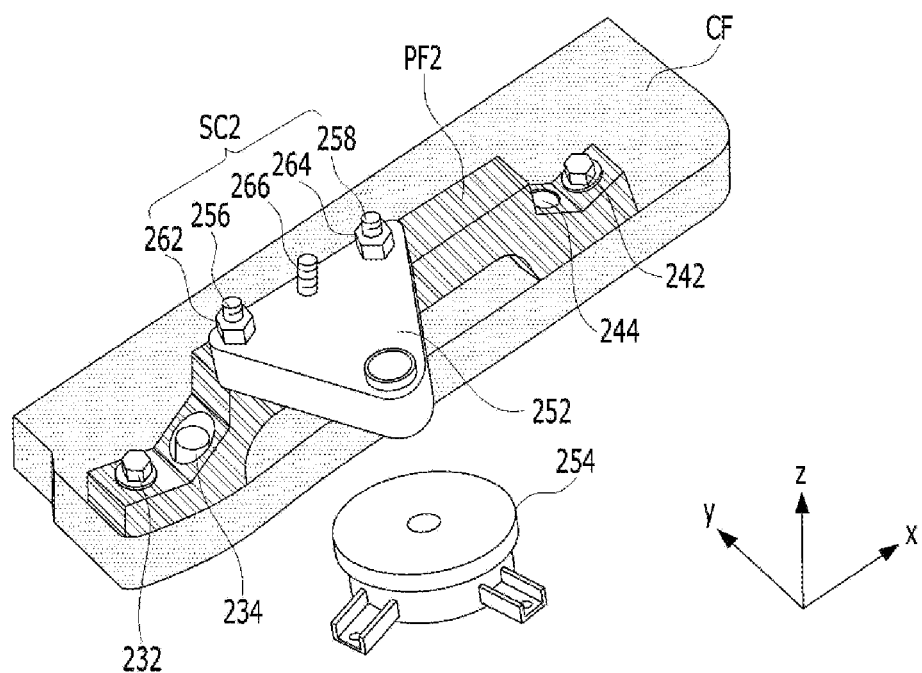
FIG. 5B is a coupled perspective view of an embodiment of the fuel cell vehicle shown in FIG. 5A.

FIG. 2A is an exploded perspective view of a fuel cell vehicle according to an embodiment, and FIG. 2B is a coupled perspective view of an embodiment of the fuel cell vehicle shown in FIG. 2A. FIG. 3 is a right side view of an embodiment of the fuel cell vehicle shown in FIG. 2B. FIG. 4 is a left side view of the embodiment of the fuel cell vehicle shown in FIG. 2B. FIG. 5A is an exploded perspective view of an embodiment of the fuel cell vehicle shown in FIG. 4, and FIG. 5B is a coupled perspective view of an embodiment of the fuel cell vehicle shown in FIG. 5A.

A fuel cell vehicle according to an embodiment may include a fuel cell 210, a system frame 220, vehicle body connection parts SC1 and SC2, vehicle body parts SF1 and SF2, and frame connection parts FC1, FC2, FC3, and FC4. Here, the fuel cell 210, the system frame 220, the vehicle body connection parts SC1 and SC2, and the frame connection parts FC1, FC2, FC3, and FC4 may be disposed in the first space 120 shown in FIG. 1.

The fuel cell 210 may include a unit fuel cell, which is not stacked in any of the first to third directions. Alternatively, the fuel cell 210 included in the fuel cell vehicle according to the embodiment may include a plurality of unit fuel cells, which are stacked in at least one of the vertical direction or the horizontal direction. For example, the fuel cell 210 may include a plurality of unit fuel cells, which are stacked in at least one of the first direction, the second direction, or the third direction.

Hereinafter, the fuel cell vehicle according to the embodiment will be described as including a single unit fuel cell, but the following description is also applicable to the case in which the fuel cell vehicle according to the embodiment includes a plurality of unit fuel cells.

The unit fuel cell may be a polymer electrolyte membrane fuel cell (or a proton exchange membrane fuel cell) (PEMFC), which has been studied most extensively as a power source for driving vehicles. However, the embodiments are not limited to any specific configuration or external appearance of the unit fuel cell.

The unit fuel cell included in the fuel cell 210 may include end plates (or pressing plates or compression plates) (not shown) and a cell stack (not shown).

The cell stack may include a plurality of unit cells, which are stacked in the first or second direction. Several tens to several hundreds of unit cells, e.g. 100 to 400 unit cells, may be stacked to form the cell stack.

Each unit cell may generate 0.6 volts to 1.0 volts of electricity, on average 0.7 volts of electricity. Thus, the number of unit fuel cells included in the fuel cell 210 and the number of the plurality of unit cells included in the cell stack of the unit fuel cell may be determined depending on the intensity of the power to be supplied from the fuel cell 210 to a load. Here, "load" may refer to a part that requires power in the fuel cell vehicle.

The end plates may be disposed at respective ends of the cell stack, and may support and fix the plurality of unit cells. In addition, the fuel cell 210 may further include a clamping member. For example, in each unit fuel cell, the clamping member serves to clamp the plurality of unit cells together with the end plates in the direction in which the unit cells are stacked.

Meanwhile, the vehicle body parts SF1 and SF2 may include first and second side members SF1 and SF2, which face each other in the vehicle width direction and extend parallel to each other in the first direction. Although not shown, a cross member may be disposed between the first and second side members SF1 and SF2. The first and second side members SF1 and SF2 may be disposed at two opposite sides of the fuel cell 210, and may correspond to the parts of the vehicle body that form side parts of the engine compartment 120 of the fuel cell vehicle.

The system frame 220 is a part on which the fuel cell 210 is disposed. Although not shown, an air compressor and a humidifier may be mounted and supported beneath the system frame 220, and the fuel cell 210, a cooling pump, and a high-voltage junction box may be mounted and supported on the system frame 220.

According to the embodiment, the system frame 220 may include a center member CF and peripheral members PF1 and PF2.

The center member CF serves to support at least a portion of the fuel cell 210. Because the air compressor and the humidifier are disposed beneath the center member CF and the fuel cell 210 and the cooling pump are disposed on the center member CF, the center member CF may have a hollow portion (not shown) formed therein in order to interconnect these components. However, the embodiments are not limited thereto.

The peripheral members may be disposed on at least one of two side end portions CFE1 and CFE2 of the center member CF, which are formed opposite each other in the vehicle width direction.

The vehicle body connection parts serve to couple the peripheral members to the vehicle body.

In general, the center member CF is coupled to the vehicle body via the vehicle body connection parts. However, according to the embodiment, the center member CF is coupled to the vehicle body via the peripheral members as well as the vehicle body connection parts.

The plurality of frame connection parts may connect the peripheral members to the center member, may be spaced apart from each other in the first direction, which is parallel to the travel direction, and may receive different respective loads.

Hereinafter, as shown in FIGS. 2A and 2B, the first and second peripheral members PF1 and PF2 will be described as being disposed on respective side end portions CFE1 and CFE2 of the center member CF. However, the embodiments are not limited thereto. That is, according to another embodiment, the peripheral member PF1 or PF2 may be disposed on only one of the two side end portions CFE1 and CFE2 of the center member CF. The following description may also apply to this case.

The peripheral members may include first and second peripheral members PF1 and PF2. The first peripheral member PF1 is disposed on one (hereinafter referred to as a "first side end portion") CFE1 of the two side end portions CFE1 and CFE2 of the center member CF. The second peripheral member PF2 is disposed on the other (hereinafter referred to as a "second side end portion") CFE2 of the two side end portions CFE1 and CFE2 of the center member CF.

The vehicle body connection parts may include first and second vehicle body connection parts SC1 and SC2. The first vehicle body connection part SC1 serves to couple (or connect or mount) the first peripheral member PF1 to the first side member SF1, and the second vehicle body connection part SC2 serves to couple (or connect or mount) the second peripheral member PF2 to the second side member SF2.

For example, referring to FIGS. 5A and 5B, the second vehicle body connection part SC2 may include a support bracket 252 and an insulator 254. The support bracket 252 may have one side connected to the second peripheral member PF2, and the insulator 254 may be disposed between the opposite side of the support bracket 252 and the second side member SF2. In this case, the insulator 254 may be directly mounted to the second side member SF2, that is, to the vehicle body.

Although not shown, the first vehicle body connection part SC1 may also include a support bracket and an insulator having the same form as the second vehicle body connection part SC2.

In addition, the vehicle body connection parts SC1 and SC2 may further include bracket connection parts connecting the support brackets 352 and 252 to the peripheral members PF1 and PF2. The bracket connection parts may include first and second bracket connection parts. The first bracket connection part may connect the support bracket 352 to the first peripheral member PF1, and the second bracket connection part may connect the support bracket 252 to the second peripheral member PF2. For example, referring to FIGS. 5A and 5B, the second bracket connection part may include a plurality of bolts 256, 258, and 266 and a plurality of nuts 262 and 264. Here, the bolt 256 may be engaged with the nut 262, the bolt 258 may be engaged with the nut 264, and the bolt 266 may be engaged with a tab (or hole) H3 formed in the second peripheral member PF2. Here, the bolts 256 and 258 may be stud bolts.

In the same form as the second bracket connection part, the first bracket connection part may also include a plurality of bolts 356, 358, and 366 and a plurality of nuts 362 and 364, and may connect the support bracket 352 to the first peripheral member PF1 using these components 356, 358, 366, 362, and 364. Here, the bolts 356 and 358 may be stud bolts.

The support brackets 252 and 352 may be made of steel.

The plurality of frame connection parts may include first to fourth frame connection parts FC1 to FC4.

The first and second frame connection parts FC1 and FC2 may connect the first peripheral member PF1 to the first side end portion CFE1, among the two side end portions CFE1 and CFE2 of the center member CF, and may be spaced apart from each other in the first direction. The third and fourth frame connection parts FC3 and FC4 may connect the second peripheral member PF2 to the second side end portion CFE2, among the two side end portions CFE1 and CFE2 of the center member CF, and may be spaced apart from each other in the first direction.

First, the third and fourth frame connection parts FC3 and FC4 will be described below with reference to FIGS. 4, 5A, and 5B.

The third and fourth frame connection parts FC3 and FC4 may connect the second peripheral member PF2 to the center member CF, may be spaced apart from each other in the first direction, which is parallel to the travel direction, and may receive different respective loads. To this end, the third and fourth frame connection parts FC3 and FC4 may use nuts and bolts.

For example, the third frame connection part FC3 may include a plurality of bolts 234 and 236 and a nut 232. The bolt 234 may be engaged with a tab H4 formed in the second peripheral member PF2 and a tab H1 formed in the center member CF, and the bolt 236 may penetrate a tab H5 formed in the second peripheral member PF2 to be engaged with the nut 232.

The fourth frame connection part FC4 may include a plurality of bolts 244 and 246 and a nut 242. The bolt 244 may be engaged with a tab H6 formed in the second peripheral member PF2 and a tab H2 formed in the center member CF, and the bolt 246 may penetrate a tab H7 formed in the second peripheral member PF2 to be engaged with the nut 242.

Here, the bolts 236 and 246 may be stud bolts.

As described above, the third and fourth frame connection parts FC3 and FC4 may couple (or connect or mount) the second peripheral member PF2 to the center member CF using the bolts and the nuts.

Next, the first and second frame connection parts FC1 and FC2 will be described below with reference to FIG. 3.

The first and second frame connection parts FC1 and FC2 may connect the first peripheral member PF1 to the center member CF, may be spaced apart from each other in the first direction, which is parallel to the travel direction, and may receive different respective loads. To this end, the first and second frame connection parts FC1 and FC2 may use nuts and bolts.

For example, the first frame connection part FC1 may include a plurality of bolts (for example, 334) and a nut 332, and the second frame connection part FC2 may include a plurality of bolts (for example, 344) and a nut 342. The engagement of the bolts and the nut in the first frame connection part FC1 may be the same as that in the third frame connection part FC3, and the engagement of the bolts and the nut in the second frame connection part FC2 may be the same as that in the fourth frame connection part FC4, and thus duplicate descriptions thereof will be omitted.

Here, the bolts (not shown), which are engaged with the nuts 232 and 242, may have the same form as the bolts 246 and 236 shown in FIG. 5A, and may be stud bolts.

Accordingly, the first and second frame connection parts FC1 and FC2 may couple (or connect or mount) the first peripheral member PF1 to the center member CF using the bolts and the nuts.

In addition, according to the embodiment, in order to allow the first and second frame connection parts FC1 and FC2 to receive different respective loads, a first spacing distance in the first direction from a first portion P1 of the first peripheral member PF1, which is coupled to the center member CF via the first frame connection part FC1, to the first vehicle body connection part 352 and a second spacing distance in the first direction from a second portion P2 of the first peripheral member PF1, which is coupled to the center member CF via the second frame connection part FC2, to the first vehicle body connection part 352 may be different from each other.

In addition, in order to allow the third and fourth frame connection parts FC3 and FC4 to receive different respective loads, a third spacing distance in the first direction from a third portion P3 of the second peripheral member PF2, which is coupled to the center member CF via the third frame connection part FC3, to the second vehicle body connection part 252 and a fourth spacing distance in the first direction from a fourth portion P4 of the second peripheral member PF2, which is coupled to the center member CF via the fourth frame connection part FC4, to the second vehicle body connection part 252 may be different from each other.

Hereinafter, for better understanding of the embodiment, a general description of load will be provided.

FIGS. 6A to 6C are diagrams for explaining general equilibrium of forces and moments. FIG. 6A is a graph for explaining the distribution of force according to a position in the first direction, in which the horizontal axis represents a position in the first direction and the vertical axis represents a position in the third direction. FIG. 6B is a graph showing the shear force V for each position in the first direction, in which the horizontal axis represents a position in the first direction and the vertical axis represents shear force. FIG. 6C is a graph showing the bending moment M for each position in the first direction, in which the horizontal axis represents a position in the first direction and the vertical axis represents a bending moment.

The force $R_1$ at the point A shown in FIG. 6A may be expressed as force F at the point B, as shown in Equation 1 below, and the force $R_2$ at the point C may be expressed as force F at the point B, as shown in Equation 2 below.

$$R_1 = \frac{Fb}{l} \quad \text{[Equation 1]}$$

$$R_2 = \frac{Fa}{l} \quad \text{[Equation 2]}$$

In Equations 1 and 2, "a" represents the distance from the point A to the point B, "b" represents the distance from the point B to the point C, and "l" represents the distance from the point A to the point C. In this case, the shear force $V_{AB}$ between the point A and the point B may be expressed using Equation 3 below, and the shear force $V_{BC}$ between the point B and the point C may be expressed using Equation 4 below.

$$V_{AB}=R_1 \quad \text{[Equation 3]}$$

$$V_{BC}=-R_2 \quad \text{[Equation 4]}$$

In addition, the moment MAB between the point A and the point B may be expressed using Equation 5 below, and the moment $M_{BC}$ between the point B and the point C may be expressed using Equation 6 below.

$$M_{AB} = \frac{Fbx}{l} \quad \text{[Equation 5]}$$

$$M_{BC} = \frac{Fa}{l}(l-x) \quad \text{[Equation 6]}$$

Here, "x" represents a position in the first direction.

When a force is applied to any point along the beam shown in FIG. 6A closer to either of the two ends of the beam than to the other end thereof, the shear force applied to the end closer to the point to which force is applied is greater than the shear force applied to the end farther from the point to which force is applied. That is, in the simple beam shown in FIG. 6A, when the force F is applied to the point B, which is closer to the point A than to the point C among the two ends of the beam, the shear force applied to the point A is greater than the shear force applied to the point C. Accordingly, a greater shear stress is applied to the section a than to the section b. Accordingly, as the magnitude of the force F increases, the section a fractures first.

Hereinafter, the equilibrium of forces and moments will be described with reference to FIG. 3, which illustrates a simplified collision load with respect to the first peripheral member PF1, on the basis of the above description. In practice, a collision load may be applied to the first peripheral member PF1 in a very complicated combination of directions. However, for better understanding and convenience of description, only the load applied in the third direction will be considered.

The relation given in the following Equation 7 may hold based on the condition of equilibrium of forces, and the relation given in the following Equation 8 may hold based on the condition of equilibrium of moments.

$$F_C=F_A+F_B \quad \text{[Equation 7]}$$

$$0=F_B \times L_2 - F_A \times L_1 \quad \text{[Equation 8]}$$

Here, "$F_A$" represents the force at a first point of action AP1 in the first portion P1 of the first peripheral member PF1, "$F_C$" represents the force at a second point of action AP2 in the first vehicle body connection part 352, and "$F_B$" represents the force at a third point of action AP3 in the second portion P2 of the first peripheral member PF1. In this case, it is assumed that the magnitudes of the forces applied to the first peripheral member PF1 may be simplified into $F_A$, $F_B$, and $F_C$ based on the vector sum of the forces by the bolts 356, 358, 366, 334, and 344.

"$L_1$" represents a first spacing distance by which the first point of action AP1 in the first portion P1 is spaced apart from the second point of action AP2 in the first vehicle body connection part 352 in the first direction, and "$L_2$" represents a second spacing distance by which the third point of action AP3 in the second portion P2 is spaced apart from the second point of action AP2 in the first direction.

Based on Equations 7 and 8 above, "$F_A$" may be expressed using Equation 9 below, and "$F_B$" may be expressed using Equation 10 below.

$$F_A = \frac{L_2}{L_1 + L_2} \times F_C \quad \text{[Equation 9]}$$

$$F_B = \frac{L_1}{L_1 + L_2} \times F_C \quad \text{[Equation 10]}$$

Referring to Equations 9 and 10 above, when the first spacing distance $L_1$ is shorter than the second spacing distance $L_2$, "$F_A$" is $L_2/L_1$ times greater than "$F_B$", and thus the stress applied to a section corresponding to the first spacing distance $L_1$ (hereinafter referred to as a "first section") is greater than the stress applied to a section corresponding to the second spacing distance $L_2$ (hereinafter referred to as a "second section"). Therefore, the first section may fracture earlier than the second section when the fuel cell vehicle is in a collision. Here, the first section is a section between the first point of action AP1 and the second point of action AP2, and the second section is a section between the third point of action AP3 and the second point of action AP2.

Next, the equilibrium of forces and moments will be described with reference to FIG. 4, which illustrates a simplified collision load with respect to the second peripheral member PF2, on the basis of the above description. In practice, a collision load may be applied to the second peripheral member PF2 in a very complicated combination of directions. However, for better understanding and convenience of description, only the load applied in the third direction will be considered.

The relation given in the following Equation 11 may hold based on the condition of equilibrium of forces, and the relation given in the following Equation 12 may hold based on the condition of equilibrium of moments.

$$F_c = F_a + F_b \quad \text{[Equation 11]}$$

$$0 = F_b \times L_4 - F_2 \times L_3 \quad \text{[Equation 12]}$$

Here, "$F_a$" represents the force at a fourth point of action AP4 in the third portion P3 of the second peripheral member PF2, which is coupled to the center member CF via the third frame connection part FC3, "$F_c$" represents the force at a fifth point of action AP5 in the second vehicle body connection part 252, and "$F_b$" represents the force at a sixth point of action AP6 in the fourth portion P4 of the second peripheral member PF2, which is coupled to the center member CF via the fourth frame connection part FC4. In this case, it is assumed that the magnitudes of the forces applied to the second peripheral member PF2 may be simplified into $F_a$, $F_b$, and $F_C$ based on the vector sum of the forces by the bolts 234, 236, 244, 246, 256, 258, and 266.

"$L_3$" represents a third spacing distance by which the fourth point of action AP4 in the third portion P3 is spaced apart from the fifth point of action AP5 in the second vehicle body connection part 252 in the first direction, and "$L_4$" represents a fourth spacing distance by which the sixth point of action AP6 in the fourth portion P4 is spaced apart from the fifth point of action AP5 in the first direction.

Based on Equations 11 and 12 above, "$F_a$" may be expressed using Equation 13 below, and "$F_b$" may be expressed using Equation 14 below.

$$F_a = \frac{L_4}{L_3 + L_4} \times F_c \quad \text{[Equation 13]}$$

$$F_b = \frac{L_3}{L_3 + L_4} \times F_c \quad \text{[Equation 14]}$$

Figure 7:
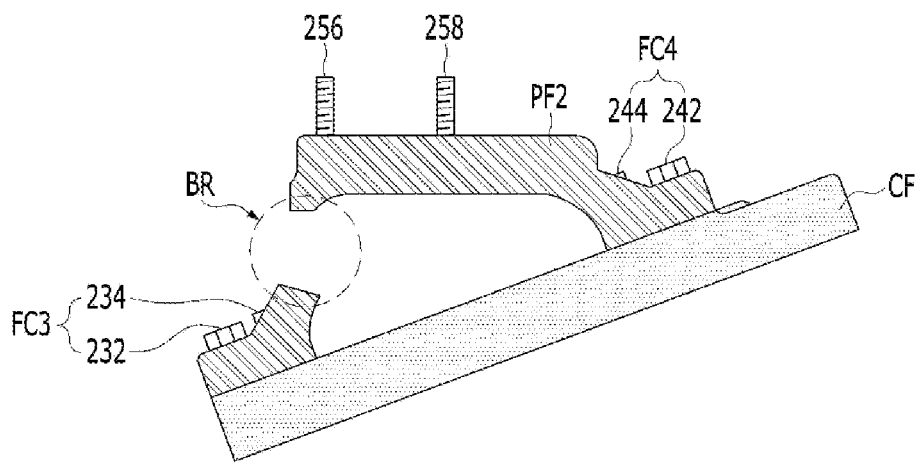
FIG. 7 is a view showing the state in which the second peripheral member shown in FIG. 4 is fractured due to a collision.

FIG. 7 is a view showing the state in which the second peripheral member PF2 shown in FIG. 4 is fractured (indicated by "BR") due to a collision. In this case, it is assumed that the collision occurs in the first or second direction.

Referring to Equations 13 and 14 above, when the third spacing distance $L_3$ is shorter than the fourth spacing distance $L_4$, "$F_a$" is $La/L_3$ times greater than "$F_b$", and thus the stress applied to a section corresponding to the third spacing distance $L_3$ (hereinafter referred to as a "third section") is greater than the stress applied to a section corresponding to the fourth spacing distance $L_4$ (hereinafter referred to as a "fourth section"). Therefore, as shown in FIG. 7, the third section may fracture (indicated by "BR") earlier than the fourth section when the fuel cell vehicle is in a collision. Here, the third section is a section between the fourth point of action AP4 and the fifth point of action AP5, and the fourth section is a section between the sixth point of action AP6 and the fifth point of action AP5.

Hereinafter, a fuel cell vehicle according to another embodiment will be described with reference to the accompanying drawings.

Figure 8A:
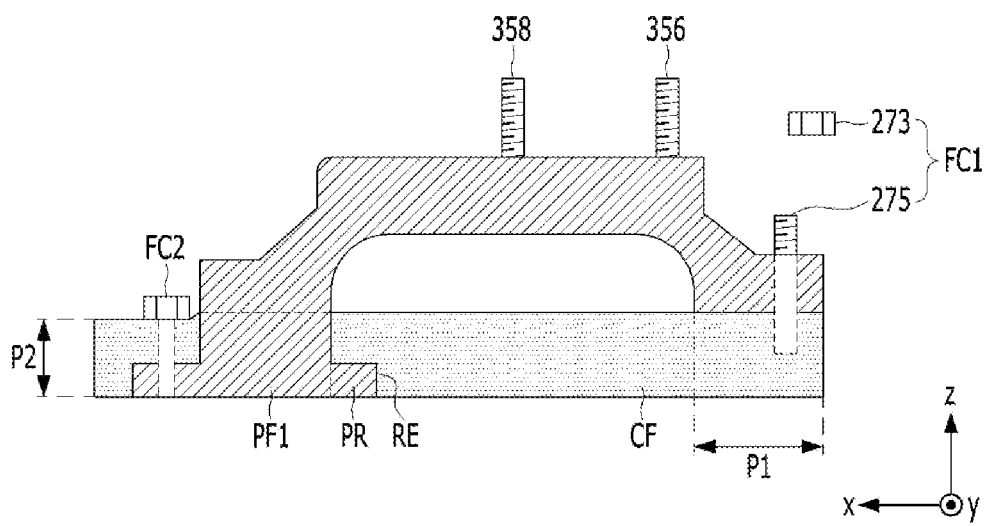
FIGS. 8A and 8B are, respectively, a right side view and a rear view of another embodiment of the fuel cell vehicle shown in FIG. 2B.
Figure 8B:
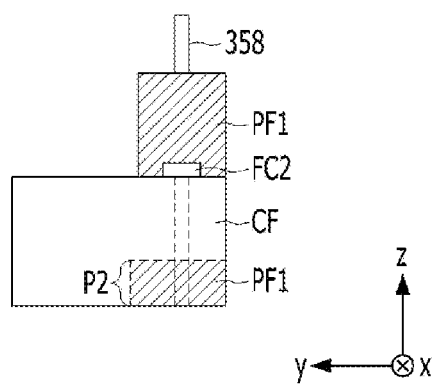

FIGS. 8A and 8B are, respectively, a right side view and a rear view of another embodiment of the fuel cell vehicle shown in FIG. 2B.

In the fuel cell vehicle shown in FIGS. 8A and 8B, the same parts as those of the fuel cell vehicle according to the above-described embodiment are denoted by the same reference numerals, and duplicate descriptions thereof will be omitted.

Unlike the fuel cell vehicle according to the above-described embodiment, in the fuel cell vehicle according to this embodiment, at least one of the first portion P1 or the second portion P2 may be coupled to the center member CF in a fitting manner. For example, as shown in FIGS. 8A and 8B, the second portion P2 may be coupled to the center member CF in a fitting manner.

The portion that is not coupled to the center member CF in a fitting manner, among the first portion P1 and the second portion P2, may be coupled to the center member CF via the frame connection part. For example, as shown in FIGS. 8A and 8B, the first portion P1, which is not coupled to the center member CF in a fitting manner, may be coupled to the center member CF via the first frame connection part FC1. Here, the first frame connection part FC1 may include a bolt 275 and a nut 273, which are engaged with each other, unlike what is shown in FIG. 3.

In addition, the portion that is coupled to the center member CF in a fitting manner, among the first portion P1 and the second portion P2, may also be coupled to the center member CF via a frame connection part. For example, as shown in FIGS. 8A and 8B, the second portion P2 may be coupled to the center member CF not only in a fitting manner but also via the second frame connection part FC2.

To this end, the portion that is coupled to the center member CF in a fitting manner, among the first portion P1 and the second portion P2, may include a protruding portion PR, and the center member CF may include a recessed portion RE formed therein to receive the protruding portion PR. Alternatively, contrary to what is shown in FIG. 8A, the portion that is coupled to the center member CF in a fitting manner, among the first portion P1 and the second portion P2, may have formed therein a recessed portion (not shown), and the center member CF may include a protruding portion (not shown) that is received in the recessed portion.

As described above, the portion coupled to the center member in a fitting manner may be less likely to fracture than the portion coupled to the center member via the frame connection part when the fuel cell vehicle is in a collision. Therefore, in the state in which the second portion P2 located in the second section is coupled to the center member CF in a fitting manner, even if a fracture occurs in the first section due to the stress applied to the first section, which is greater than the stress applied to the second section, the likelihood that a fracture will occur in the second section may be further reduced, and thus the second portion P2 may be maintained in a fixed state. Particularly, in the second section, to which a relatively low stress is applied, even if the coupled state between the first peripheral member PF1 and the center member CF via the second frame connection part FC2 is damaged, the coupled state between the first peripheral member PF1 and the center member CF in a fitting manner may not be damaged.

In addition, according to the embodiment, in the state in which the stress at the first point of action AP1 and the stress at the third point of action AP3 are equal to each other, the first peripheral member PF1 may be coupled to the center member CF in a manner such that only one of the first and second portions P1 and P2 is fitted into the center member CF.

Figure 9A:
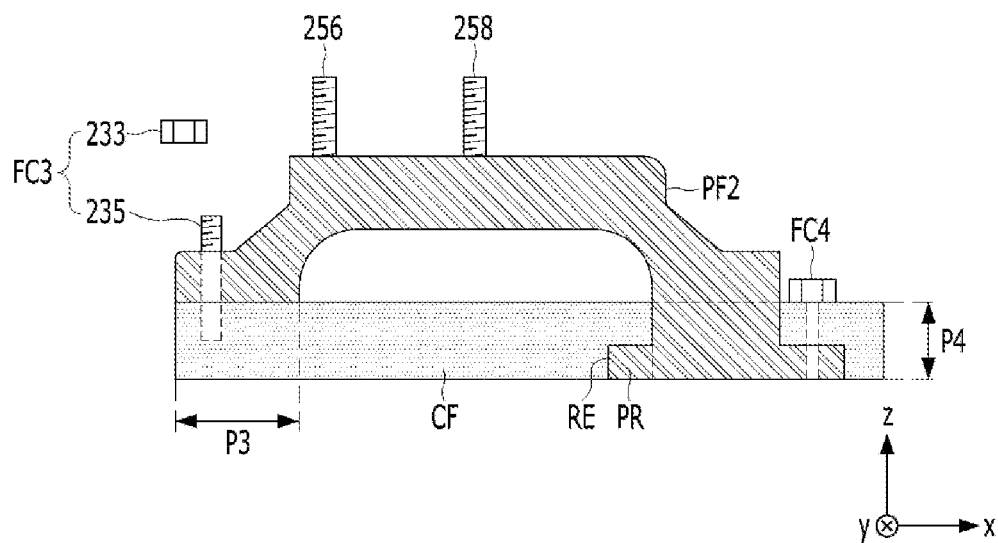
FIGS. 9A and 9B are, respectively, a left side view and a rear view of the other embodiment of the fuel cell vehicle shown in FIG. 2B.
Figure 9B:
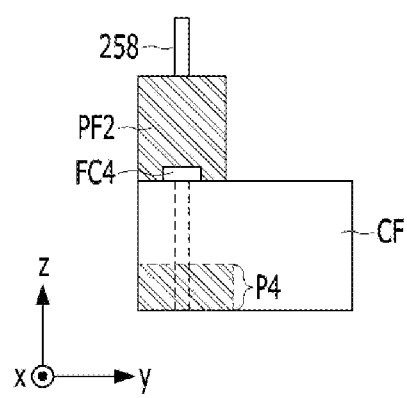

FIGS. 9A and 9B are, respectively, a left side view and a rear view of the other embodiment of the fuel cell vehicle shown in FIG. 2B.

In the fuel cell vehicle shown in FIGS. 9A and 9B, the same parts as those of the fuel cell vehicle according to the above-described embodiment are denoted by the same reference numerals, and duplicate descriptions thereof will be omitted.

Unlike the fuel cell vehicle according to the above-described embodiment, in the fuel cell vehicle according to this embodiment, at least one of the third portion P3 or the fourth portion P4 may be coupled to the center member CF in a fitting manner. For example, as shown in FIGS. 9A and 9B, the fourth portion P4 may be coupled to the center member CF in a fitting manner.

The portion that is not coupled to the center member CF in a fitting manner, among the third portion P3 and the fourth portion P4, may be coupled to the center member CF via the frame connection part. For example, as shown in FIGS. 9A and 9B, the third portion P3, which is not coupled to the center member CF in a fitting manner, may be coupled to the center member CF via the third frame connection part FC3. Here, the third frame connection part FC3 may include a bolt 235 and a nut 233, which are engaged with each other, unlike what is shown in FIG. 4.

In addition, the portion that is coupled to the center member CF in a fitting manner, among the third portion P3 and the fourth portion P4, may also be coupled to the center member CF via a frame connection part. For example, as shown in FIGS. 9A and 9B, the fourth portion P4 may be coupled to the center member CF not only in a fitting manner but also via the fourth frame connection part FC4.

To this end, the portion that is coupled to the center member CF in a fitting manner, among the third portion P3 and the fourth portion P4, may include a protruding portion PR, and the center member CF may include a recessed portion RE formed therein to receive the protruding portion PR. Alternatively, contrary to what is shown in FIG. 9A, the portion that is coupled to the center member CF in a fitting manner, among the third portion P3 and the fourth portion P4, may have formed therein a recessed portion (not shown), and the center member CF may include a protruding portion (not shown) that is received in the recessed portion.

Figure 10:
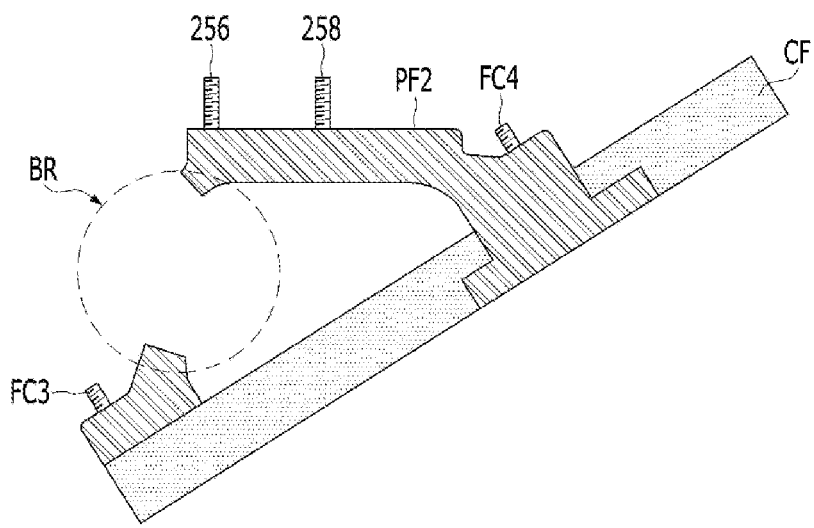
FIG. 10 is a view showing the state in which the second peripheral member shown in FIG. 9A is fractured due to a collision.

FIG. 10 is a view showing the state in which the second peripheral member PF2 shown in FIG. 9A is fractured (indicated by "BR") due to a collision. In this case, it is assumed that the collision occurs in the first or second direction.

As described above, the portion coupled to the center member in a fitting manner is less likely to fracture than the portion coupled to the center member via the frame connection part when the fuel cell vehicle is in a collision. Therefore, in the state in which the fourth portion P4 located in the fourth section is coupled to the center member CF in a fitting manner, even if a fracture BR occurs in the third section due to the stress applied to the third section, which is greater than the stress applied to the fourth section, the likelihood that a fracture will occur in the fourth section may be further reduced, and thus the fourth portion P4 may be maintained in a fixed state, as shown in FIG. 10. Particularly, in the fourth section, to which a relatively low stress is applied, even if the coupled state between the second peripheral member PF2 and the center member CF via the fourth frame connection part FC4 is damaged, the coupled state between the second peripheral member PF2 and the center member CF in a fitting manner may not be damaged.

In addition, according to the embodiment, in the state in which the stress at the fourth point of action AP4 and the stress at the sixth point of action AP6 are equal to each other, the second peripheral member PF2 may be coupled to the center member CF in a manner such that only one of the third and fourth portions P3 and P4 is fitted into the center member CF.

Hereinafter, a fuel cell vehicle according to still another embodiment will be described with reference to the accompanying drawings.

Figure 11:
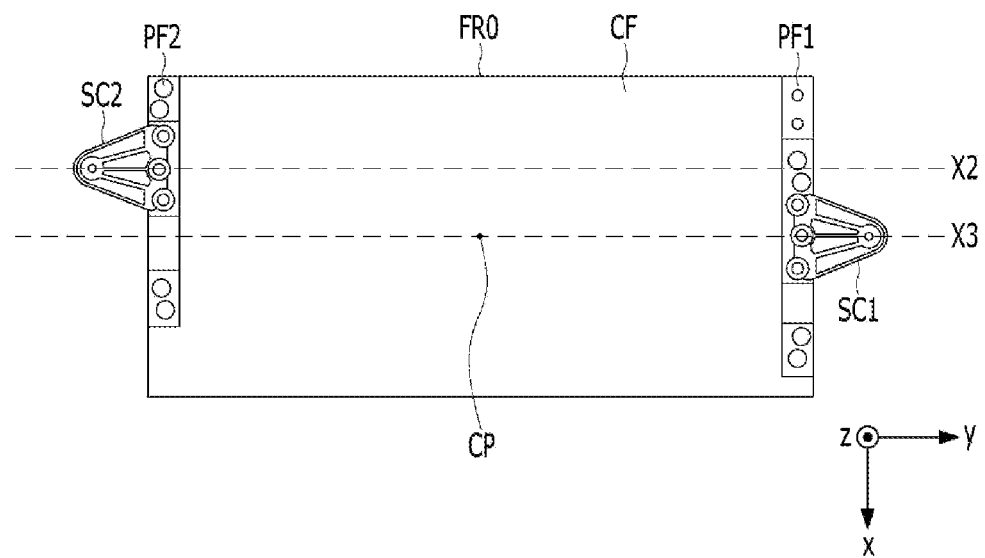
FIG. 11 is a plan view of a fuel cell vehicle according to still another embodiment.
Figure 12:
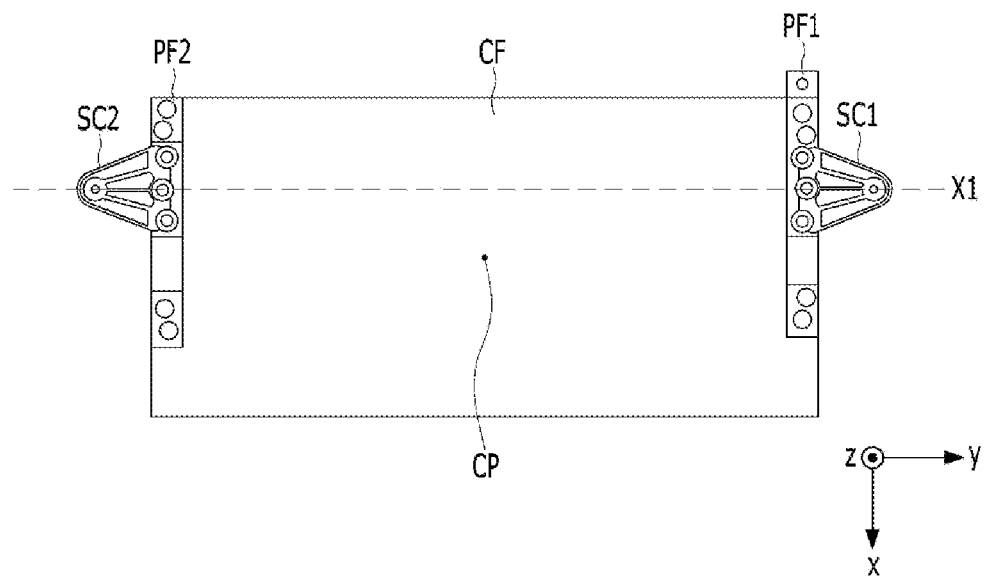
FIG. 12 is a plan view of the fuel cell vehicle for helping understanding the fuel cell vehicle shown in FIG. 11.

FIG. 11 is a plan view of a fuel cell vehicle according to still another embodiment, and FIG. 12 is a plan view of the fuel cell vehicle for helping understanding the fuel cell vehicle shown in FIG. 11.

In the fuel cell vehicle shown in FIGS. 11 and 12, the same parts as those of the fuel cell vehicle according to the above-described embodiment are denoted by the same reference numerals, and duplicate descriptions thereof will be omitted.

In the fuel cell vehicle shown in FIG. 12, the first vehicle body connection part SC1 and the second vehicle body connection part SC2 may have planar shapes that are symmetrical to each other in the second direction, which is the vehicle width direction, with respect to the center CP of the center member CF. That is, the first vehicle body connection part SC1 and the second vehicle body connection part SC2 may be located along the same horizontal line X1.

Alternatively, according to still another embodiment, the first vehicle body connection part SC1 and the second vehicle body connection part SC2 may have planar shapes that are not symmetrical to each other in the second direction, which is the vehicle width direction, with respect to the center CP of the center member CF. That is, the second vehicle body connection part SC2 may be disposed closer to the front side FRO of the fuel cell vehicle than the first vehicle body connection part SC1. That is, a horizontal line X2 along which the second vehicle body connection part SC2 is located may be located closer to the front side of the fuel cell vehicle than a horizontal line X3 along which the first vehicle body connection part SC1 is located.

As shown in FIG. 11, when the first vehicle body connection part SC1 coupled to the first peripheral member PF1 and the second vehicle body connection part SC2 coupled to the second peripheral member PF2 are formed to be asymmetrical to each other in the vehicle width direction, the stress that is applied to the components PF2 and SC2 located at the left side of the fuel cell vehicle and the stress that is applied to the components PF1 and SC1 located at the right side of the fuel cell vehicle may differ from each other when the fuel cell vehicle is in a head-on collision. Thus, the components to which a relatively high stress is applied may fracture so that the components to which a relatively low stress is applied may be maintained in a fixed state, rather than fracturing.

In addition, each of the first and second peripheral members PF1 and PF2 may be formed of any of various materials, so long as the material thereof is capable of exhibiting an effect of absorbing strain energy by converting the collision energy into the strain energy through deformation thereof. As described above, in order to prevent a portion to which a relatively low stress is applied from fracturing when a portion to which a relatively high stress is applied fractures, each of the first and second peripheral members PF1 and PF2 may be formed of a material having a high elongation.

Because aluminum alloys have a maximum elongation of 65% depending on the kind thereof, each of the first and second peripheral members PF1 and PF2 may be formed of an aluminum material having a high elongation from the aspect of absorption of strain energy. When each of the first and second peripheral members PF1 and PF2 includes aluminum, effects of absorption of collision energy by the components PF1 and SC1 located at the right side of the fuel cell vehicle and the components PF2 and SC2 located at the left side of the fuel cell vehicle can be expected. Accordingly, a portion to which a relatively low stress is applied may assuredly retain a non-fractured state.

In order to satisfy global technical regulations (GTR) and collision safety regulations enacted in individual countries, it may be required for at least a part of a system frame of a fuel cell vehicle not to separate from a vehicle body but to remain fixed to the vehicle body when the fuel cell vehicle is in a collision in any direction, for example, a head-on collision, a rear-end collision, or a lateral collision.

In the fuel cell vehicle according to the embodiment, the peripheral members PF1 and PF2 and the vehicle body connection parts SC1 and SC2 may be disposed such that the portions of the peripheral members PF1 and PF2 that are coupled to the center member CF via the plurality of frame connection parts receive different respective loads. Accordingly, only a portion to which a relatively high stress is applied may fracture, and a portion to which a relatively low stress is applied may be maintained in a fixed state, rather than fracturing. Accordingly, at least a portion of each of the peripheral members PF1 and PF2 may remain coupled to the center member CF when the fuel cell vehicle is in a collision, and thus the system frame may be prevented from being separated from the vehicle body, thereby making it possible to satisfy collision safety regulations.

As is apparent from the above description, in the fuel cell vehicle according to the embodiment, the peripheral members and the vehicle body connection parts may be disposed such that the portions of the peripheral members that are coupled to the center member via the plurality of frame connection parts receive different respective loads. Accordingly, only a portion to which a relatively high stress is applied fractures, and a portion to which a relatively low stress is applied is maintained in a fixed state, rather than fracturing. Accordingly, at least a portion of each of the peripheral members remains coupled to the center member in the event of a collision, and thus the system frame is prevented from being separated from the vehicle body. As a result, the fuel cell vehicle is capable of satisfying collision safety regulations.

However, the effects achievable through the disclosure are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell vehicle, comprising:
   a fuel cell;
   a system frame comprising a center member, configured to support at least a portion of the fuel cell, and a peripheral member, disposed on at least one of two side end portions of the center member, the two side end portions being formed opposite each other in a vehicle width direction;
   a vehicle body connection part configured to couple the peripheral member to a vehicle body; and
   a plurality of frame connection parts configured to couple the peripheral member to the center member, the plurality of frame connection parts being spaced apart from each other in a first direction parallel to a travel direction, and the plurality of frame connection parts receiving different respective loads.

2. The fuel cell vehicle according to claim 1, wherein the peripheral member comprises:
   a first peripheral member disposed on one of the two side end portions; and
   a second peripheral member disposed on a remaining one of the two side end portions.

3. The fuel cell vehicle according to claim 2, wherein the vehicle body comprises first and second side members disposed opposite each other in the vehicle width direction and extending parallel to each other in the first direction, and wherein the vehicle body connection part comprises:
   a first vehicle body connection part configured to couple the first peripheral member to the first side member; and
   a second vehicle body connection part configured to couple the second peripheral member to the second side member.

4. The fuel cell vehicle according to claim 3, wherein the plurality of frame connection parts comprises:
- first and second frame connection parts configured to couple the first peripheral member to one of the two side end portions of the center member, the first and second frame connection parts being spaced apart from each other in the first direction; and
- third and fourth frame connection parts configured to couple the second peripheral member to a remaining one of the two side end portions of the center member, the third and fourth frame connection parts being spaced apart from each other in the first direction.

5. The fuel cell vehicle according to claim 4, wherein the first peripheral member comprises a first portion coupled to the center member via the first frame connection part and a second portion coupled to the center member via the second frame connection part,
- wherein the first portion is spaced a first spacing distance apart from the first vehicle body connection part in the first direction,
- wherein the second portion is spaced a second spacing distance apart from the first vehicle body connection part in the first direction, and
- wherein the first spacing distance and the second spacing distance are different from each other.

6. The fuel cell vehicle according to claim 5, wherein the first spacing distance corresponds to a distance by which a first point of action in the first portion is spaced apart from a second point of action in the first vehicle body connection part in the first direction, and
- wherein the second spacing distance corresponds to a distance by which a third point of action in the second portion is spaced apart from the second point of action in the first direction.

7. The fuel cell vehicle according to claim 6, wherein the first spacing distance is shorter than the second spacing distance, and
- wherein a stress applied to a section corresponding to the first spacing distance is greater than a stress applied to a section corresponding to the second spacing distance.

8. The fuel cell vehicle according to claim 7, wherein one of the first portion and the second portion is coupled to the center member in a fitting manner.

9. The fuel cell vehicle according to claim 8, wherein the first portion is coupled to the center member via the first frame connection part, and
- wherein the second portion is coupled to the center member not only via the second frame connection part but also in the fitting manner.

10. The fuel cell vehicle according to claim 4, wherein the second peripheral member comprises a third portion coupled to the center member via the third frame connection part and a fourth portion coupled to the center member via the fourth frame connection part,
- wherein the third portion is spaced a third spacing distance apart from the second vehicle body connection part in the first direction,
- wherein the fourth portion is spaced a fourth spacing distance apart from the second vehicle body connection part in the first direction, and
- wherein the third spacing distance and the fourth spacing distance are different from each other.

11. The fuel cell vehicle according to claim 10, wherein the third spacing distance corresponds to a distance by which a fourth point of action in the third portion is spaced apart from a fifth point of action in the second vehicle body connection part in the first direction, and
- wherein the fourth spacing distance corresponds to a distance by which a sixth point of action in the fourth portion is spaced apart from the fifth point of action in the first direction.

12. The fuel cell vehicle according to claim 11, wherein the third spacing distance is shorter than the fourth spacing distance, and
- wherein a stress applied to a section corresponding to the third spacing distance is greater than a stress applied to a section corresponding to the fourth spacing distance.

13. The fuel cell vehicle according to claim 12, wherein one of the third portion and the fourth portion is coupled to the center member in a fitting manner.

14. The fuel cell vehicle according to claim 13, wherein the third portion is coupled to the center member via the third frame connection part, and
- wherein the fourth portion is coupled to the center member not only via the fourth frame connection part but also in the fitting manner.

15. The fuel cell vehicle according to claim 3, wherein the vehicle body connection part comprises:
- a support bracket having one side coupled to the peripheral member; and
- an insulator disposed between an opposite side of the support bracket and the first side member.

16. The fuel cell vehicle according to claim 15, wherein the insulator is directly mounted to the second side member.

17. The fuel cell vehicle according to claim 15, wherein the first vehicle body connection part includes the support bracket and the insulator having the same form as the second vehicle body connection part.

18. The fuel cell vehicle according to claim 3, wherein the first vehicle body connection part and the second vehicle body connection part have planar shapes formed to be asymmetrical to each other in the vehicle width direction with respect to a center of the center member.

19. The fuel cell vehicle according to claim 18, wherein the second vehicle body connection part is disposed closer to a front side of the fuel cell vehicle than the first vehicle body connection part.

20. The fuel cell vehicle according to claim 1, wherein the peripheral member comprises aluminum.

* * * * *